United States Patent
Kuo et al.

(10) Patent No.: US 10,140,708 B2
(45) Date of Patent: Nov. 27, 2018

(54) METHOD FOR GESTATIONAL AGE ESTIMATION AND EMBRYONIC MUTANT DETECTION

(71) Applicants: Riverside Research Institute, New York, NY (US); New York University, New York, NY (US)

(72) Inventors: Jen-wei Kuo, Jersey City, NJ (US); Jonathan Mamou, New York, NY (US); Jeffrey A. Ketterling, New York, NY (US); Orlando Aristizabal, Jackson Heights, NY (US); Daniel H. Turnbull, Larchmont, NY (US); Yao Wang, Livingston, NJ (US)

(73) Assignee: Riverside Research Institute, New York, NY (US)

( * ) Notice: Subject to any disclaimer, the term of this patent is extended or adjusted under 35 U.S.C. 154(b) by 49 days.

(21) Appl. No.: 15/413,001

(22) Filed: Jan. 23, 2017

(65) Prior Publication Data

US 2017/0213340 A1  Jul. 27, 2017

Related U.S. Application Data

(60) Provisional application No. 62/281,284, filed on Jan. 21, 2016.

(51) Int. Cl.
*G06K 9/00* (2006.01)
*G06T 7/00* (2017.01)

(52) U.S. Cl.
CPC .. *G06T 7/0012* (2013.01); *G06T 2207/10136* (2013.01); *G06T 2207/30016* (2013.01); *G06T 2207/30044* (2013.01)

(58) Field of Classification Search
None
See application file for complete search history.

(56) References Cited

U.S. PATENT DOCUMENTS

2005/0177212 A1* 8/2005 Njemanze ............... A61F 7/12
                                                     607/104
2007/0134656 A1* 6/2007 Sharma ............... G01N 33/6896
                                                     435/6.11

(Continued)

OTHER PUBLICATIONS

Kuo, Jen-Wei, et al. "Automatic Mouse Embryo Brain Ventricle Segmentation, Gestation Stage Estimation, and Mutant Detection from 3D 40-MHz Ultrasound Data", IEEE, Oct. 2015, pp. 1-4, USA.

(Continued)

*Primary Examiner* — Kevin Ky
(74) *Attorney, Agent, or Firm* — Keith D. Nowak; CarterLedyard & Milburn, LLP

(57) ABSTRACT

A method to characterize shape variations in brain ventricles during embryonic growth in mammals, the method including extracting a brain ventricle skeleton from one or more images, calculating a volume profile for the skeleton using the extracted images, partitioning the brain ventricle based on the volume profile along the skeleton, the brain ventricle being partitioned into two lateral ventricles and a main ventricle, the main ventricle being further partitioned into three sub regions, determining volume vectors of the two lateral ventricles and the three sub regions, computing a means square error between the determined computed volume vectors and a pretrained mean volume vector of embryos during different gestational stages, and classifying the embryo to the gestational stage having the lowest mean square error. A method to characterize mutant detection in mammals, the method including acquiring one or more images, computing a volume profile directly along a path of the detected skeleton from the one or more images, aligning the volume profile against a standard profile, and evaluating (Continued)

the volume profile against the standard profile to detect a mutation.

11 Claims, 4 Drawing Sheets
(3 of 4 Drawing Sheet(s) Filed in Color)

(56) References Cited

U.S. PATENT DOCUMENTS

| | | | |
|---|---|---|---|
| 2008/0026385 A1* | 1/2008 | Sharma | C12Q 1/6886 435/6.14 |
| 2009/0105141 A1* | 4/2009 | Dodge | A61K 38/30 514/6.9 |
| 2009/0177279 A1* | 7/2009 | Luciano | A61M 1/1072 623/11.11 |
| 2014/0161338 A1* | 6/2014 | Machado | A61B 5/0042 382/131 |
| 2015/0206300 A1* | 7/2015 | Nowinski | G06K 9/46 382/131 |

OTHER PUBLICATIONS

Li et al. "Decomposing Polygon Meshes for Interactive Applications," ACM Symp. on Interactive 3D Graphics, Mar. 2001, pp. 35-42, USA.

* cited by examiner

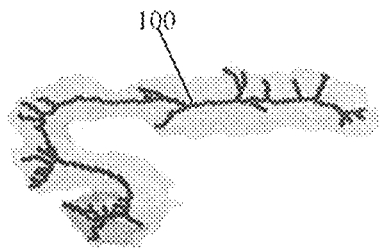
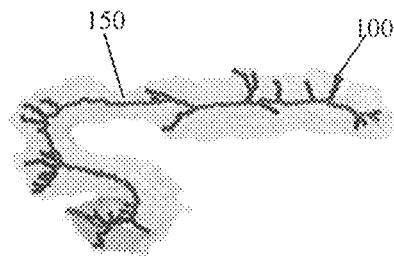
Fig. 2a
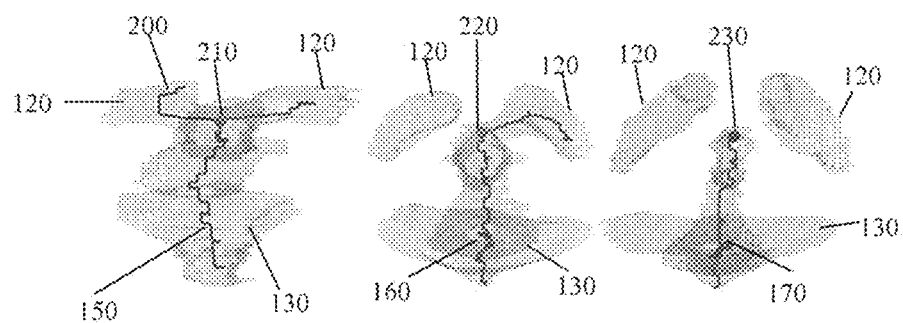
Fig. 2b　　　　Fig. 2c　　　　Fig. 2d

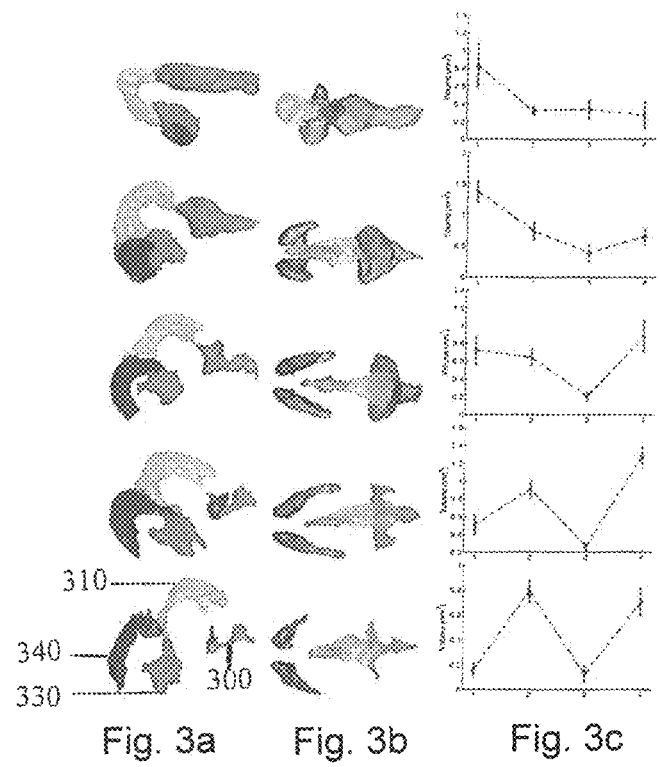
Fig. 3a  Fig. 3b  Fig. 3c
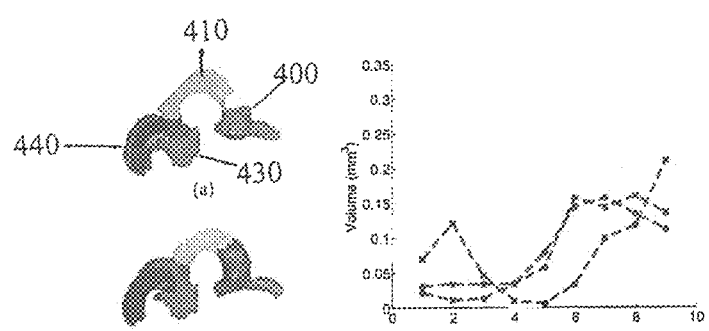
Fig. 4a
Fig. 4b  Fig. 4c

METHOD FOR GESTATIONAL AGE ESTIMATION AND EMBRYONIC MUTANT DETECTION

PRIORITY AND RELATED APPLICATION

This application claims priority to U.S. Provisional Patent Application No. 62/281,284 filed Jan. 21, 2016 entitled "METHOD FOR GESTATIONAL AGE ESTIMATION AND EMBRYONIC MUTANT DETECTION" and is hereby incorporated by reference in its entirety.

FIELD OF THE INVENTION

The present invention relates to streamlining development biology studies. More specifically the present invention relates to gestational staging and mutant detection.

BACKGROUND OF THE INVENTION

The analysis of brain ventricles (BVs) is important in the study of normal and abnormal development of the central nervous system. The mouse has been used as a model to study mammalian development because of the high degree of homology between the mouse and human genome. Studying how mutations manifest themselves during embryonic development in mice assists in the study of the human central nervous system. Real time imaging modalities and automated image processing methods are needed in such studies.

Magnetic resonance imaging (MRI), high frequency ultrasounds (HFU) and other imaging methods have become common imaging tools for imaging the developing mouse embryo. Each imaging method provides information about physical properties of tissue, but the image contrast differs. HFU provides fine-resolution, non-invasive images with real-time dynamic information. Image segmentation of the BVs in HFU or other chosen imaging modality can be difficult and time consuming, particularly if some portions of boundaries are missing. A method for accurately and automatically segmenting such images is taught in the Patent Application titled "Method of Automatic Tissue Segmentation of Medical Images" by the present inventors filed on Jan. 23, 2017, and is hereby incorporated by reference in its entirety. This teaches an automatic segmentation method called nested graph cut (NGC) and is effective for segmenting multiple nested objects in 2D or 3D images. NGC provides accurate image segmentation even when the objects have missing boundaries. NGC automatically segments BVs, head, amniotic fluid and uterus in images of mouse embryos.

A space sweeping method to separate a 3D polygon mesh into components was proposed in "Decomposing Polygon Meshes for Interactive Applications," by Li et. al. In the proposed space sweeping method, the area profile of cross sections perpendicular to the sweep path are obtained. (The sweep path is defined by the skeleton of a target polygon mesh). A boundary between two adjacent components is then determined by analyzing the derivatives of the profile along the skeleton. However, the cross sectional area may be inconsistent along the sweeping path with a sharp turn. Such sharp turns may occur in single components of BVs, and therefore such a method may not provide accurate results.

SUMMARY OF THE INVENTION

The present invention relates to characterizing the shape variation of the BVs during embryonic growth and due to genetic mutations. The present invention provides a framework to characterize the shape variation of BVs by extracting the skeleton of the BV region, and decomposing the BV region into five components automatically based on the volume profile along the skeleton. Using the volumes of the five components can lead to quite accurate staging of the embryos. Furthermore, the volume profile along the skeleton can be used to detect mutants with abnormal shapes. These fully automatic methods are invaluable in streamlining development biology studies requiring quantitative central nervous system assessment, staging and mutant detection.

The present invention provides a method to characterize shape variations in brain ventricles during embryonic growth in mammals, the method including extracting a brain ventricle skeleton from one or more images, calculating a volume profile for the skeleton using the extracted images, partitioning the brain ventricle based on the volume profile along the skeleton, the brain ventricle being partitioned into two lateral ventricles and a main ventricle, the main ventricle being further partitioned into three sub regions, determining volume vectors of the two lateral ventricles and the three sub regions, computing a means square error between the determined computed volume vectors and a pretrained mean volume vector of embryos during different gestational stages, and classifying the embryo to the gestational stage having the lowest mean square error.

The present invention also provides a method to characterize mutant detection in mammals, the method including acquiring one or more images, computing a volume profile directly along a path of the detected skeleton from the one or more images, aligning the volume profile against a standard profile, and evaluating the volume profile against the standard profile to detect a mutation.

BRIEF DESCRIPTION OF THE DRAWINGS

The patent or application filed contains at least one drawing executed in color. Copies of this patent or patent application publication with color drawing(s) will be provided by the Office upon request and payment of the necessary fee.

Further objects, features and advantages of the invention will become apparent from the following detailed description taken in conjunction with the accompanying figures showing illustrative embodiments of the invention, in which:

FIGS. 2a-2d illustrate the BV region of a raw skeleton;

DETAILED DESCRIPTION OF THE INVENTION

The BVs in the embryo head image are part of a nested structure. The BVs are inside the head, the head is inside the amniotic fluid and the amniotic fluid is inside the uterus. NGC can be used as an effective tool for image segmentation of the nested objects where there are missing boundaries. NGC defines the missing boundary of an object within a nested structure by the convex hull of its outer object. In the present invention, NGC is used to characterize the shapes of the BV in the acquired image. Using the BV shapes provided through NGC, the present invention further partitions the BVs into five different components: a fourth ventricle, an aqueduct, a third ventricle and two lateral ventricles. These five components exist in all gestational stages and their spatial relationship can be represented by a Y-shaped skeleton called a Y-skeleton.

A Y-skeleton contains one main skeleton and two lateral skeletons. The main skeleton crosses the main ventricle which is the union of the fourth ventricle, aqueduct and the third ventricle. The lateral skeletons connect the lateral ventricles and the main ventricle. A central node connects the three skeletons—the main skeleton and the two lateral skeletons.

Figure 1:
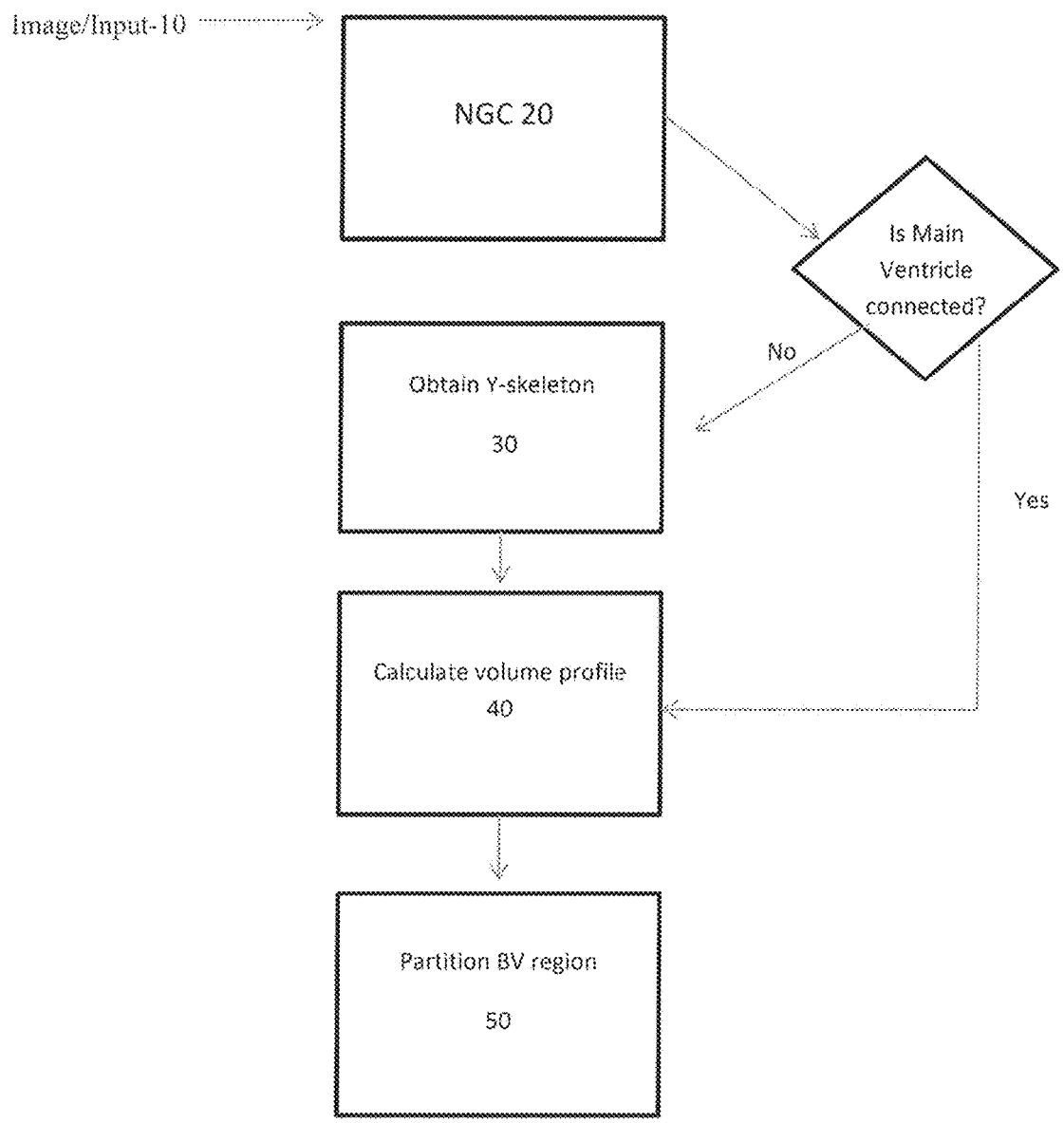
FIG. 1 provides a flowchart of the proposed method.

FIG. 1 provides a flowchart of the present invention. The image is acquired, 10, and NGC is used to segment the BV, 20, within the image. If the components of the BV are disconnected after NGC, a corrected skeleton, a Y-skeleton, with connected main ventricle components must be obtained, 30. After the Y-skeleton is obtained, 30, or if the BV is connected after NGC, a volume profile along the Y-skeleton is calculated, 40. Finally, the entire BV region is partitioned into the five components (sub-regions), 50, based on the changes of volume profile along the skeleton of all the images.

Obtaining the Raw Skeleton

In late gestation stages, the connection between BVs may become invisible in the acquired image and therefore are disconnected in the NGC segmentation result. In order to obtain a correct skeleton for the main ventricle, all components of the main ventricle must be connected in advance. As shown in FIG. 2b, the structure of BVs is nearly symmetric. Therefore, to determine the components of the main ventricle, principle component analysis is applied to the volume of the BVs in order to find the symmetry plane. All components are then connected crossing the symmetry plane to obtain a fully connected main ventricle. Once all of the components of the main ventricle are connected, a parallel homotopic thinning algorithm, as taught in "Building Skeleton Models Via 3-D Medial Surface/Axis Thinning Algorithms" by Lee et. al, may be applied to the BV region to retrieve the raw skeleton. As shown in FIG. 2a, the raw skeleton may have many branches due to rough surfaces. FIG. 2a shows the raw skeleton of the BV region in E10.5. Blue branches 100 denote the raw skeleton and green branch 150 is the longest skeleton of the BV region. FIG. 2b shows the top view of the BV region of FIG. 2a. Central node 210, in red, divides the longest skeleton 150 into a main skeleton and a lateral skeleton 120.

Retrieving the Raw Skeleton

The Y-skeleton is retrieved from the raw skeleton in a two-step process. First, the geodesic distance of all pairs of end nodes on the raw skeleton are compared to find the longest skeleton. There are three possible conditions for the connected BV region. When one or two lateral ventricles are connected with the main ventricle, the longest skeleton will include the main ventricle and one lateral ventricle as shown in FIGS. 2b and 2c.

Next, the central node, the red node, of the Y-skeleton must be determined to separate the main skeleton and the lateral skeleton. When both lateral ventricles are connected to the main ventricle (FIG. 2b) the central node 210 is defined as the node on the longest skeleton 150 having the longest branch, branch 200 in FIG. 2b. Branch 200 is the lateral skeleton other than the one on the longest skeleton 150. When only one lateral ventricle is connected with the main ventricle (FIG. 2c), the central node 220 is defined as the point on the longest skeleton 160 having the shortest Euclidean distance to the center point of the disconnected lateral ventricle, which is the mean position of all voxels in the volume of the disconnected lateral ventricle. In FIG. 2d, both lateral ventricles are disconnected from the main ventricle, therefore the longest skeleton 170 is the main ventricle having central node 230.

Computing the Volume Profile

In contrast to Li et. al. which uses the area of a cross section of a polygon mesh skeleton, the present invention divides the entire BV region into several sub regions by uniformly sampling points along the skeleton and determining a sub region surrounding each sampled point using a Voroni region partition. More specifically, the sub-region surrounding each sampled point includes all points in the original volume that are closer to this sampled point than other points. The volume profile is built along the skeleton by computing the volume of each sub region along the skeleton. By choosing the appropriate number of samples along the skeleton the volume profile can represent the volume variation pattern along the skeleton well.

BV Partitioning into Multiple Components

To partition the BV into five components, the images with different conditions are treated differently. For images in which both lateral ventricles 120 are separated from the main ventricle 130 (FIG. 2d), the two lateral ventricles 120 do not need to be further separated and only the main ventricle 130 needs to be partitioned in the three components—fourth ventricle, aqueduct and third ventricle. For images where one lateral ventricle 120 or both lateral ventricles 120 are connected to the main ventricle 130 (FIGS. 2b and 2c), the one lateral ventricle 120 must be partitioned from the main ventricle 130 and then the main ventricle 130 must be further partitioned in the 3 components.

For identifying the boundary between the lateral ventricle and the main ventricle, and for identifying the boundary between two adjacent components in the main ventricle at the intersection point between two components along the skeleton, the volume profile has a large second order positive derivative and the intersection of the two adjacent components has a small area. Therefore the intersection point can be identified by finding the minimum of the following energy functional:

$$E(t) = \frac{A(t)}{V(t) * (F''(t) - \min(F''))} \quad (1)$$

$$V_{HL}(t) = \begin{cases} 1 & \text{when } F'(t) < 0 \\ 0 & \text{when } F'(t) > 0 \end{cases}$$

where F'(t) and F" are the first and second order derivatives of the volume profile F(t), and A(t) is the area of the intersection between two adjacent sub-volumes. V(t) is used to define the valid region. $V(t)=V_{HL}(t)$ when searching for the transition from a component with a high volume to a component with a low volume, for example, from the fourth ventricle to the aqueduct. $V(t)=1-V_{HL}(t)$ when searching for the transition from a component with a low volume to a component with a high volume, for example, from the aqueduct to a third ventricle. When two components are disconnected, A(t)=0, so the energy functional is always the minimum.

If the BV region has one or both lateral ventricles 120 connected to the main ventricle 130, as in FIG. 2b or 2c, the lateral ventricles 120 are first separated from the main ventricle 130. To do this, a volume profile is calculated for points on each of the lateral skeletons in FIG. 2b or the only lateral skeleton in FIG. 2c. From the central node to the end node in the lateral ventricle, the boundary is defined at the point having the lowest value as E(t) with $V(t)=V_{HL}(t)$.

After separating all lateral ventricles, the remaining main ventricle is broken down in the order of the fourth ventricle, aqueduct and the third ventricle. For example, the gradient of the volume near the intersection between the fourth ventricle and the aqueduct should be negative because the volume suddenly reduces from the fourth ventricle to the aqueduct. Therefore $V(t)=V_{HL}(t)$ is set to search for the boundary between the fourth ventricle and the aqueduct. When searching for the boundary between the aqueduct and the third ventricle, $V(t)=1-V_{HL}(t)$ is set, because the gradient of the volume should be positive.

Mouse Embryo Staging Using Volume Vectors

In order to determine the stage the of mouse embryo, BV segmentation is performed, its volume vector is determined and the mean square errors is computed. Therefore in staging the embryo, after the BV has been partitioned into the five components, a 4-dimensional volume vector is computed which contains the volumes of the fourth ventricle, the aqueduct and the third ventricle, respectively, and the sum of the volumes of the two lateral ventricles. The mean square error between the volume vector and the pretrained mean volume vectors of the mouse embryos in the different stages is computed and the embryo is then classified to the stage with the least error.

Mutant Detection Using the Volume Profiles

For mutant detection, the volume profile is computed along the path of the detected skeleton directly. By aligning and evaluating the volume profile against the standard profile during normal development, a mutation can be detected.

EXAMPLE

Volumetric ultrasound data were acquired in utero and in vivo from pregnant mice using a 5-element, 40-MHz annular array. A 5-channel pulser was used to consecutively excite each array element. The 25 resulting transmit/receive signals processed using delay-and-sum beamforming yielded a depth of field sufficient to cover the entire head of the embryo. The method was applied to 40 wild type embryos spanning from days E10.5 to E14.5.

A. Staging

Figure 3:
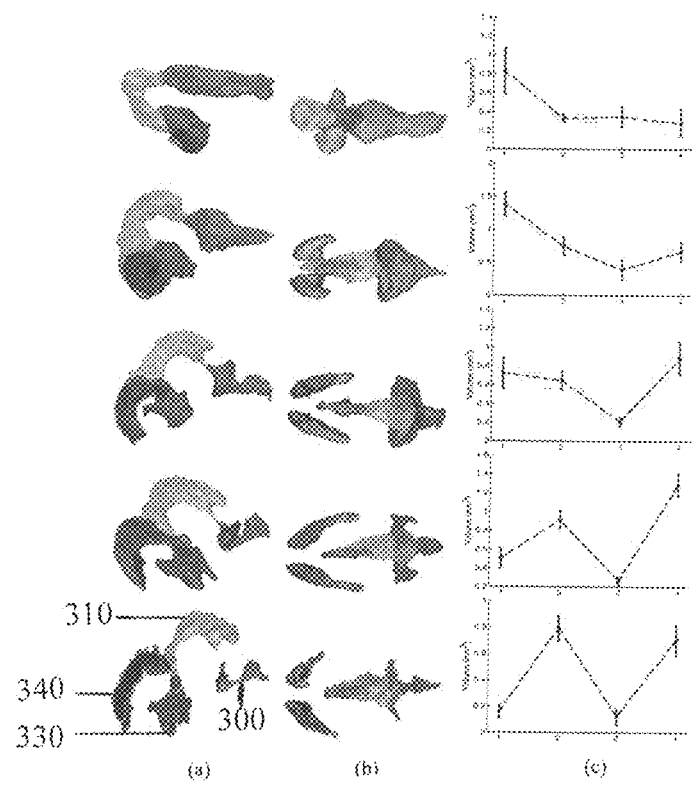
FIGS. 3a-3c illustrate the segmentation results for a typical image from each gestational stage, the volume vectors computed for the images and the mean volume vector for each gestation stage.

The method was tested on 40 mouse embryo head-region images crossing five gestation stages. NGC was used to segment the BVs in each image and its Y-skeleton and the volume profile along the skeleton were derived from the segmentation of the images. Based on the volume profile, the BV region was partitioned into five components and the volume vector was calculated. FIGS. 3a-3c show the partitioning results for a typical image from each gestation stage, the volume vectors computed for all images and the mean volume vector for each gestation stage. Each row shows these results from E10.5 to E14.5 from top to bottom. FIG. 3a shows the side view of the BVs. The fourth ventricle 300 is green, aqueduct 310 is in yellow, third ventricle 330 is in magenta and the two lateral ventricles 340 are in cyan. FIG. 3c shows the volume vector (gray) and the mean volume vector (blue) for each of the images in the same stage. 1 to 4 in the x-axis denotes the fourth ventricle, the aqueduct, the third ventricle and the lateral ventricles, respectively. The vertical bars on the mean vectors show the standard deviation of the volume of each component. The volume vectors of embryos in different stages follow quite distinct trends.

To evaluate the performance of volume vectors for staging, leave-one-out cross-validation was applied. That is, one image was left from testing, and all remaining images were used to compute the mean volume vectors and determine the stage of the left-out image by comparing its volume vector with all mean vectors. Table I below shows the staging result for the test images through the cross validation process. The staging accuracy is significantly higher than using a simple criterion such as the ratio of the BV region to the total head region. In Table I, E12.5 means the embryo is 12 to 13 days old. Therefore, an embryo in this stage can be close to E11.5 or E13.5 as calculated by the present invention. Since we use the mean volume vector of each stage for determining the stage of a given embryo, this classifier may not perform well for embryos at the boundary of different stages. Using additional features or normalized features (e.g. normalizing the volume of each component by the total volume of BVs or the head) may also bring additional improvements.

TABLE 1

Staging Result

|  | E10.5 | E11.5 | E12.5 | E13.5 | E14.5 |
| --- | --- | --- | --- | --- | --- |
| Total image number | 9 | 9 | 13 | 5 | 4 |
| False staging by BVs-head ratio | 3-E11.5 1-E14.5 | 2-E10.5 1-E12.5 | 1-E13.5 2-E14.5 | 2-E12.5 1-E14.5 | 1-E12.5 |
| False staging by volume vector | 1-E11.5 | 1-E12.5 | 1-E11.5 1-E13.5 | 0 | 0 |

B. Mutant Detection

Figure 4:
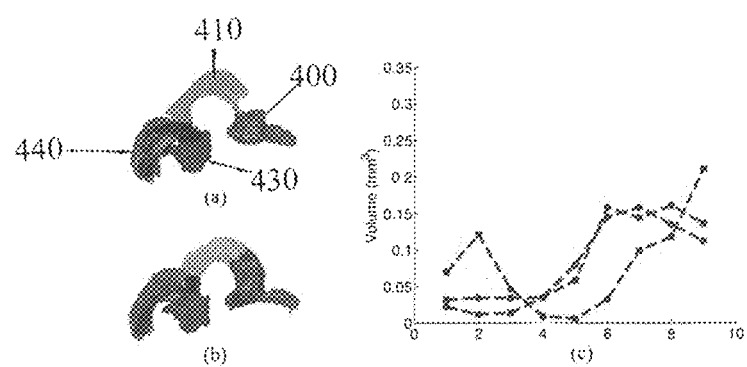
FIGS. 4a-4c illustrate the portioning result of a normal embryo and a mutant embryo with a volume profile.

Two engrailed 1 (En1) mutants that manifest with loss of midbrain tissue were studied. These two mutant BVs have a thicker connection between the fourth ventricle and aqueduct than normal BVs as seen in FIGS. 4a and 4b. FIG. 4a shows the partitioning result of a normal embryo at stage E12.5. FIG. 4b shows the partitioning results of a mutant embryo. The intersection point separating the fourth ventricle and the aqueduct is found after dividing the BV into five components, computing the volume profile along the Y-skeleton near this point, and comparing this volume profile with the profiles of normal BVs in the same stage. FIG. 4c shows the volume profile near boundary between fourth ventricle 400 and the aqueduct 410. The x axis indicates the sample point on the skeleton. The fifth point on the profile is the intersection point. Gray lines are the volume profile of the normal BVs and the blue line is their mean volume profile. The two red lines indicate the volume profiles of two mutant BVs. As shown in FIG. 4(c), the mutants have a very different profile from those of the normal embryos.

Although the present invention has been described in conjunction with specific embodiments, those of ordinary skill in the art will appreciate the modifications and variations that can be made without departing from the scope and spirit of the present invention.

The invention claimed is:

1. A method to characterize shape variations in brain ventricles during embryonic growth in mammals, the method comprising:
   extracting a brain ventricle skeleton from one or more images;
   calculating a volume profile for the skeleton using the extracted images;

partitioning the brain ventricle based on the volume profile along the skeleton, the brain ventricle being partitioned into two lateral ventricles and a main ventricle, the main ventricle being further partitioned into three sub regions;

determining volume vectors of the two lateral ventricles and the three sub regions;

computing a means square error between the determined computed volume vectors and a pretrained mean volume vector of embryos during different gestational stages; and classifying the embryo to the gestational stage having the lowest mean square error;

wherein if the extracted brain ventricle skeleton from the image has disconnected, obtaining a y-skeleton prior to partitioning, obtaining a y-skeleton comprising:

applying a principle component analysis to a volume of the brain ventricle to find a symmetry plane;

connecting all of the components crossing the symmetry plane to obtain a fully connected main ventricle;

applying a parallel homotopic thinning algorithm to the brain ventricle region to retrieve a raw skeleton;

comparing a geodesic distance of all pairs of end nodes on the raw skeleton to find a longest skeleton; and determining a central node to separate the main ventricle and the two lateral ventricles.

2. The method as recited in claim 1 wherein the three sub regions of the main ventricle are partitioned in an order of a fourth ventricle, a aqueduct and a third ventricle.

3. The method as recited in claim 1, wherein the method occurs automatically.

4. The method as recited in claim 1 wherein the volume profile is built along the skeleton by computing a volume of the two lateral ventricles and each sub region along the skeleton for each image.

5. The method as recited in claim 4 wherein the volume profile represents a volume variation along the skeleton of the one or more images.

6. The method as recited in claim 1 wherein an intersection of two adjacent sub regions has a small area and is determined by finding a minimum energy functional.

7. The method as recited in claim 1 wherein one or both of the lateral ventricles are separated from the main ventricle by calculating a volume profile for points on each connected lateral skeletons, wherein a boundary from a central node to an end node of a connected lateral ventricle is the point having a lowest energy functional.

8. The method as recited in claim 1 wherein the sub region is partitioned where a gradient near an intersection between a fourth ventricle and an aqueduct is negative and a gradient between the aqueduct and a third ventricle is positive.

9. The method as recited in claim 1 wherein determining the volume vectors comprises computing a 4-dimensional volume vector containing a volume of the fourth ventricle, an aqueduct and a third ventricle and adding a sum of the volumes of the lateral ventricles of the one or more images.

10. The method as recited in claim 1 wherein nested graph cutting is used to extract the brain ventricle from the one or more images.

11. The method as recited in claim 1 wherein the embryonic growth is for mouse embryos.

* * * * *

UNITED STATES PATENT AND TRADEMARK OFFICE
CERTIFICATE OF CORRECTION

PATENT NO. : 10,140,708 B2
APPLICATION NO. : 15/413001
DATED : November 27, 2018
INVENTOR(S) : Jen-wie Kuo et al.

It is certified that error appears in the above-identified patent and that said Letters Patent is hereby corrected as shown below:

On the Title Page

Item (73) Assignees should read:
Riverside Research Institute, New York, NY (US)
New York University, New York, NY (US)

Signed and Sealed this
Fifteenth Day of January, 2019

Andrei Iancu
*Director of the United States Patent and Trademark Office*